United States Patent Office 3,360,939
Patented Jan. 2, 1968

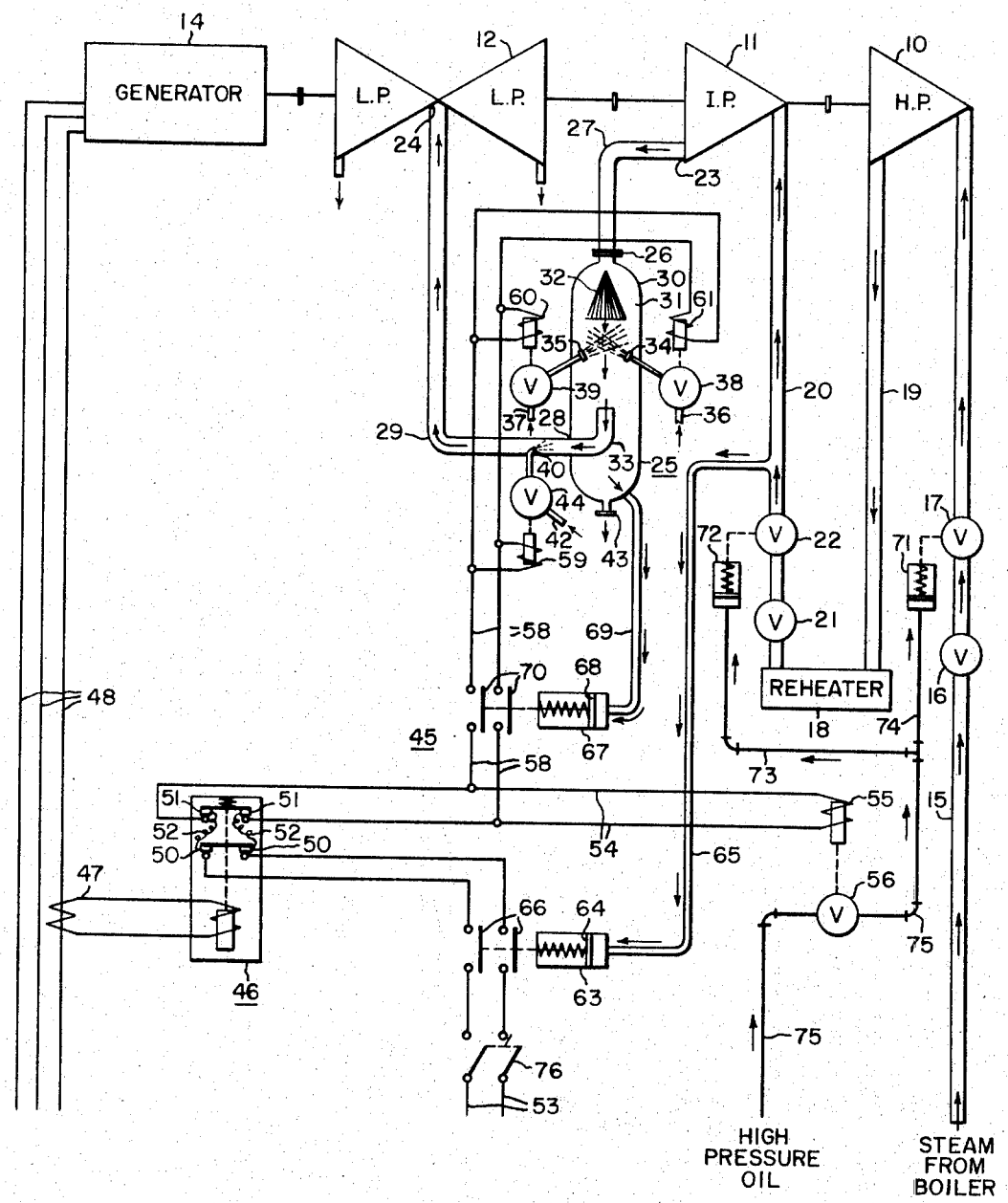

3,360,939
REDUCING THE POTENTIAL OVERSPEED OF TURBINE-GENERATORS
Frank A. Beldecos, Media, Pa., assignor to Westinghouse Electric Corporation, Pittsburgh, Pa., a corporation of Pennsylvania
Filed Dec. 15, 1965, Ser. No. 513,977
8 Claims. (Cl. 60—73)

This invention relates to turbine power plants, and more particularly to steam turbine power plants of the plural turbine unit type, and has for an object to provide apparatus for reducing the motive power of the steam trapped in the turbine system after the control valves have closed.

The overspeed potential of present day steam turbine power plants employing large volumetric flow rates of motive steam has approached large values due to the large energy of steam still in the system after the steam valves are closed in response to sudden loss of load. This steam, being uncontrolled, continues to flow through the turbine unit or units downstream of the valves and is expanded to condenser pressure with attendant undesirable acceleration of the turbine rotor to unsafe speeds before the conventional speed control can assume control of the system.

The above problem is especially serious in steam turbine power plants motivated by steam generated by nuclear power, since large external moisture separators are employed between turbine units to remove the moisture formed in the steam after partial expansion in the preceding unit, and the thus dried steam is subsequently further expanded in the subsequent unit before exhausting it to a steam condenser.

It is a primary object of the invention to minimize the potential overspeed of a steam turbine power plant due to entrapped steam therein by restraining the flow of the entrapped steam to the subsequent turbine unit.

Another object is to minimize the potential overspeed of a steam turbine power plant due to entrapped steam by spraying water thereinto in a manner to obstruct the flow of the steam to the subsequent turbine unit and/or to greatly reduce the pressure and/or energy level of the steam.

A still further object is to minimize the potential overspeed of a multiunit turbine power plant due to steam entrapped in the shell of a moisture separator after the supply of motive steam is cut off in response to sudden loss of load, by injecting water in finely divided form into and/or immediately downstream of the moisture separator in response to the loss of load.

Briefly, the invention is incorporated in a plural turbine unit power plant comprising at least a first and higher pressure turbine unit supplied with motive steam regulated by a valve structure, a second and lower pressure turbine unit supplied with partially expanded steam from the higher pressure turbine unit, and a load, for example, an electric generator driven by the turbine units. A moisture separator is interposed between the two turbine units to reduce the moisture content of the partially expanded steam before further expansion in the second turbine unit.

The power plant is provided with a load sensing control that is effective to close the steam valve structure quickly in response to sudden loss of load, thereby interrupting the flow of steam to the higher pressure turbine unit.

In accordance with the invention, there are provided a plurality of spray devices, activated in response to the loss in load, to provide water sprays effective to restrict flow of the trapped volume of steam from the moisture separator to the lower pressure turbine and to dissipate the energy of the thus trapped steam safely in the separator. Any condensation that possibly may occur is removed from the moisture drain outlet at the bottom of the separator.

The above and the objects are effected by the invention as will be apparent from the following description and claims taken in connection with the accompanying drawing, forming a part of this specification, in which:

The sole figure illustrates diagrammatically a multiunit turbine-generator power plant having the invention incorporated therein.

Referring to the drawing in detail, there is shown a multiunit turbine-generator power plant having a high pressure (H.P.) turbine unit 10, an intermediate pressure (I.P.) turbine unit 11 and a double opposed-flow low pressure (L.P.) turbine unit 12, connected in tandem and jointly driving an electric generator 14.

High pressure motive steam from any suitable supply, for example, a nuclear reactor (not shown) is admitted to the H.P. turbine unit 10 by a conduit 15 having the usual throttle valve 16 and governing valve structure 17 interposed therein.

After partial expansion in the H.P. turbine unit 10, the steam is directed to a suitable reheater 18 by a conduit 19, and the thus reheated steam is then directed to the I.P. turbine unit 11 by a conduit 20 for further expansion. The conduit 20 has a conventional reheat stop valve 21 interposed therein that, as well known, is normally fully open but is rapidly closed by a suitable control system (not shown) in response to malfunction of the turbines jointly with the throttle valve 16 to interrupt the flow of steam to the turbine.

An interceptor valve 22 is also interposed in the conduit 20 downstream of the reheat stop valve 21.

Between the exhaust outlet 23 of the I.P. turbine 11 and the inlet 24 of the L.P. turbine 12 there is interposed a moisture separator 25 having an upper inlet 26 connected to the I.P. turbine outlet 23 by a steam conduit 27 and having a lower outlet 28 connected to the L.P. turbine inlet 24 by a conduit 29. The moisture separator comprises a large shell 30 acting as a pressure vessel and defining a chamber 31 having a suitable device 32 in its upper portion for separating moisture from the steam admitted thereto by the conduit 27, and an axially extending upwardly opening duct 33 for conveying the demoisturized steam to the conduit 29.

A plurality (two as indicated) of spray nozzles 34 and 35 are disposed in the changer 31 and connected to a suitable pressurized water supply (not shown) by conduits 36 and 37. The nozzles 34 and 35 are jointly activated by electrically energized solenoid valves 38 and 39 to spray water in finely divided or atomized form into the chamber 31. A third spray nozzle 40 activated by a solenoid valve 41 is disposed in the conduit 29 and connected to the same water supply (not shown) as the spray nozzles 34 and 35 by a conduit 42. The solenoid valves 38, 39 and 41 are normally closed but are movable to the open position, as will be described later, and the spray nozzles 34 and 35 are preferably upwardly inclined while the spray nozzle 40 is disposed in a manner to spray upstream with regard to steam flow through the conduit 29.

In normal operation, as thus far described, the throttle valve 16, reheat stop valve 21 and the interceptor valve 22 are fully open, and the governing valve 17 is regulated to the degree of opening required to admit high pressure motive steam to the turbine units at a rate effective to satisfy the load requirements of the generator 14, by a suitable speed control mechanism (not shown).

The steam undergoes partial expansion in the H.P. turbine unit 10 with attendant reduction of temperature and is thence reheated in the reheater 18 substantially to its original temperature and further expanded in the I.P. turbine unit 11. During expansion in the I.P. turbine, the steam atains a degree of saturation with attendant formation of moisture, and is directed to the moisture separator 25 for substantial removal of such moisture by action of the separator device 32. The moisture separator device 32 may be of any suitable type but has been illustrated as of the type known as a Centrifix, which type includes a conical array of vanes for centrifugally separating the relatively heavy moisture particles from the considerably lighter steam flow. The thus separated moisture is collected at the bottom of the pressure vessel 30 and is drawn off through a suitable condensate outlet 43 connected to a region of lower pressure (not shown), while the demoisturized steam is directed to the L.P. turbine unit 12 for final expansion and exhausted therefrom to a suitable vapor condenser (not shown).

There is provided a control system, generally indicated 45, including a load sensing relay 46, controlled by a suitable current transformer 47 sensing load current on at least one of the generator output conductors 48 and having two sets of contacts 50 and 51 normally biased to the closed position and connected to each other by suitable flexible conductors 52. The contacts 50 cooperate with suitable stationary input contacts connected to a suitable electrical supply (not shown) by a pair of conductors 53. The contacts 51 cooperate with suitable stationary output contacts connected by conductors 54 to the winding 55 of a normally closed solenoid valve 56 and by paralleled conductors 58 to the windings 59, 60 and 61 of the solenoid water control valves 38, 39 and 41, respectively.

A pressure switch 63 having a piston 64 disposed in fluid communication with the steam conduit 20 by a conduit 65 and having a set of normally open contacts 66 is provided for completing the electrical supply circuit through the conductors 53. Also, a pressure switch 67 having a piston 68 disposed in fluid communication with the chamber 31 of the moisture separator by a conduit 69 and having a set of normally open contacts 70 is provided for completing the electrical circuit through the conductors 58 to the solenoid valves 38, 39 and 41. The governing valve 17 is controlled by a hydraulic servo mechanism 71 and the interceptor valve 22 is likewise controlled by a hydraulic servo mechanism 72 actuated by pressurized hydraulic fluid directed thereto by paralleled conduits 73 and 74 connected to a suitable source of supply (not shown) by a conduit 75 having the valve 56 interposed therein.

At starting, the load sensing relay contacts 50 and 51 are closed, since there is no lead current in the generator output conductors 48. Also, the contacts of the pressure switches 63 and 67 are open, since there is no steam pressure in the conduit 20 and the moisture separator shell 30, respectively. Accordingly, the valve 56 is deenergized and in its normally closed position. Similarly, the water control valves 38, 39 and 41 are deenergized and in their normally closed position.

After starting, as the steam pressures in the conduit 20 and the moisture separator vessel 30 rise to their normal value, they are effective to urge the respective pressure switches 63 and 67 into their circuit closing positions.

However, as the load current in the conductors 48 rises above a predetermined value, for example about 25% of rated load, the load sensing relay is sufficiently energized to initially move and maintain its contacts 50 and 51 in the open position as long as the load is above 25% of rated load. Therefore, the solenoid valves 56, 38, 39 and 41 remain deenergized and in their normally closed positions.

In the event of sudden loss of load to a value below 25% of rated load, the load sensing relay is sufficiently deenergized to permit movement of its contacts 50 and 51 to their closed positions, thereby completing the parallel circuit to (1) energize the solenoid valve 56 to the open position and admit pressurized hydraulic fluid to the servos 71 and 72 to quickly close the governing valve 17 and the interceptor valve 22, and (2) energize the solenoid valves 38, 39 and 41 to activate the associated water spray nozzles 34, 35 and 40.

Accordingly, steam flow to the H.P. turbine unit 10 is interrupted by closure of the governing valve 17 and to the I.P. turbine unit 11 by closure of the interceptor valve 22.

Jointly with the above steam flow interruption, the spray nozzle 40 is effective to inject a strong water spray in upstream direction into the duct 33 to restrict the flow of steam therethrough to the L.P. turbine unit 12, and the spray nozzles 34 and 35 are jointly effective to desuperheat and substantially dissipate the energy of the steam contained in the moisture separator vessel 30. Accordingly, the large volume of steam remaining in the system downstream of the interceptor valve 22 is restrained from flowing to the L.P. turbine 12 and its energy is dissipated, thereby preventing further expansion of such steam in the L.P. turbine unit 12 and the attendant possibility of undesirable overspeeding of the turbine and generator rotors (not shown).

The above phenomenon is effective for a very short period of time, on the order of 3 to 20 seconds, since as the steam pressure decays in the vessel 30, the pressure switch 67 returns to its normal circuit opening position and terminates the water spray.

In a similar manner, as the pressure in the steam conduit 20 decays, the pressure switch 63 returns to its normal circuit opening position, deenergizing the solenoid valve 56 and permitting it to return to its normally closed position. As the valve 56 interrupts the supply of hydraulic fluid, the servo mechanisms 71 and 72 reopen the associated governing valve 17 and the interceptor valve 22, thereby restoring the flow of motive steam to the turbine units. However, the interval of time between the sudden loss of load and the reopening of the governing valve 17 and the interceptor valve 22 is sufficient to prevent overspeeding of the turbine and generator rotors until the conventional turbine control system (not shown) is able to assume speed control with the reduced load and/or to shut down the entire system, if so indicated. A manually operable switch 76 may be employed, if desired, to positively interrupt the circuit in the electrical conductors 53 during starting. This switch is moved to the circuit making position after the load rises above 25% of rated load.

The water sprays are effective for a short interval. However, during this interval, a sufficient quantity of water is injected into the moisture separator to absorb as much energy from the entrapped steam as possible. In practice, it is preferable to inject an excess of water, thereby to ensure that a large quantity of the steam is condensed.

In instances where the entrapped steam is superheated, with the injection of the water the condition of the steam degenerates from superheated to saturated steam with a large amount of condensation to form water. Of course, in instances where the entrapped steam is at saturated condition, the steam readily degenerates to a more saturated condition with a larger amount of condensation occurring. The water thus formed is readily removable from the system, as previously described, for example through the drain outlet 45 in the shell 30.

The water employed is preferably free of impurities that are scale forming or otherwise harmful to the system.

It will now be seen that the invention provides a simple yet effective arrangement for substantially minimizing the dangerous overspeeding of a turbine power plant with a sudden large reduction or loss of load that would otherwise be occasioned due to the energy of the entrapped motive steam in the system.

While the invention has been shown in one form, it will be obvious to those skilled in the art that it is not

I claim as my invention:

1. In a power plant comprising:
   at least a first pressure turbine unit supplied with motive steam through a valve structure,
   a second pressure turbine unit supplied with partially expanded steam from the first turbine,
   a pressure vessel interposed between said first and second turbines for receiving the partially expanded steam before admission to said second turbine, and
   a load driven by said last said second turbine unit,
   the improvement comprising spray structure for spraying water in finely divided form into contact with the partially expanded steam in a manner to minimize flow of said expanded steam from said vessel to said second turbine unit, and
   power sensing means responsive to a sudden reduction in power demand by said load to concomitantly close said valve structure and activate said spray structure, thereby respectively interrupting the flow of steam to said first turbine unit and restricting the flow of steam to said second turbine unit.

2. The apparatus recited in claim 1, in which
   the vessel has a steam outlet conduit connected to the second turbine unit, and the spray structure includes a spray nozzle disposed in said conduit in a manner to spray liquid in upstream direction with regard to steam flow.

3. The apparatus recited in claim 1, in which
   a conduit is provided to direct the partially expanded steam from said vessel to said second turbine unit, and
   the spray structure includes a first spray nozzle disposed in said conduit to restrict the flow of steam to said second turbine unit and at least a second spray nozzle disposed in said vessel to reduce the pressure of the steam contained therein.

4. The apparatus recited in claim 1, in which
   the spray structure is effective to reduce the steam pressure in said vessel, and
   means responsive to reduction of steam pressure in said vessel is provided to deactivate said spray structure.

5. The apparatus recited in claim 1 and further including:
   first means responsive to pressure of the steam upstream of the first turbine unit, and
   second means responsive to pressure of the partially expanded steam in said vessel,
   said first and second means coacting with each other to deactivate the spray structure when the upstream steam pressure drops and the vessel steam pressure drops below predetermined values.

6. The apparatus recited in claim 1 and further including:
   first means responsive to pressure of the unexpanded steam downstream of the value structure, and
   second means responsive to pressure of the partially expanded steam in said vessel,
   said first and second means coacting with each other and the power reduction sensing means to establish and maintain activation of the spray structure as long as the unexpanded steam pressure and the partially expanded steam pressure persists above predetermined values.

7. The apparatus recited in claim 1, in which
   the pressure vessel is provided with a moisture separator to separate the entrained moisture from the partially expanded steam before delivery to the second turbine unit, and
   said pressure vessel is further provided with an outlet for draining the moisture therefrom.

8. The apparatus recited in claim 1, in which
   the spray structure and the valve structure are controlled by electrically actuated valve means, and
   the power sensing means is effective to complete an electrical circuit to the electrically actuated valve means in response to reduction in power demand.

No references cited.

EDGAR W. GEOGHEGAN, *Primary Examiner.*
ROBERT R. BUNEVICH, *Examiner.*